(12) United States Patent  (10) Patent No.: US 7,204,503 B2
Goding et al.  (45) Date of Patent: Apr. 17, 2007

(54) WHEELCHAIR WHEEL

(76) Inventors: David Goding, 33/61 Marlborough St Surry Hills, Sydney, NSW (AU) 2010; Nick Morris, 540 Kays Lane, Tarrawingee, VIC (AU) 3677

( * ) Notice: Subject to any disclaimer, the term of this patent is extended or adjusted under 35 U.S.C. 154(b) by 0 days.

(21) Appl. No.: 10/485,092

(22) PCT Filed: Jul. 29, 2002

(86) PCT No.: PCT/AU02/01012

§ 371 (c)(1),
(2), (4) Date: Aug. 17, 2004

(87) PCT Pub. No.: WO03/011202

PCT Pub. Date: Feb. 13, 2003

(65) Prior Publication Data

US 2005/0006871 A1  Jan. 13, 2005

(30) Foreign Application Priority Data

Jul. 27, 2001 (AU) ................................. PR6682
Apr. 22, 2002 (AU) ................................. 42359/02

(51) Int. Cl.
*A61G 5/10* (2006.01)
*B60B 21/00* (2006.01)
(52) U.S. Cl. ................ 280/304.1; 280/250.1; 297/DIG. 4; 74/552; 74/558; 301/95.104; 301/95.106
(58) Field of Classification Search ............. 280/250.1, 280/304.1; 297/DIG. 4; 74/552, 558; 301/95.104, 301/95.106
See application file for complete search history.

(56) References Cited

U.S. PATENT DOCUMENTS

| 2,938,738 | A |   | 5/1960 | La Rue et al. |
| 4,366,964 | A |   | 1/1983 | Farey et al. |
| 4,687,218 | A | * | 8/1987 | Okamoto ................. 280/250.1 |
| 5,734,142 | A | * | 3/1998 | Kazmierczak ......... 301/95.104 |
| 6,024,413 | A | * | 2/2000 | Dixon et al. ........... 301/95.104 |
| 6,048,035 | A | * | 4/2000 | Chen ..................... 301/95.104 |
| 6,241,268 | B1 | * | 6/2001 | Niklasson ............... 280/250.1 |
| 6,276,705 | B1 | * | 8/2001 | Baldwin et al. ......... 280/250.1 |
| 6,283,557 | B1 | * | 9/2001 | Okajima et al. ....... 301/95.104 |
| 2001/0007389 | A1 | * | 7/2001 | Frauwirth ................ 280/304.1 |
| 2001/0028192 | A1 | * | 10/2001 | Okajima et al. ....... 301/95.101 |
| 2005/0077700 | A1 | * | 4/2005 | Smith et al. ............ 280/304.1 |

FOREIGN PATENT DOCUMENTS

| EP | 0 363 780 A1 | 4/1990 |
| GB | 856490 | 12/1960 |
| JP | 7304302 | 11/1995 |
| JP | 9193602 | 7/1997 |

* cited by examiner

*Primary Examiner*—Lesley D. Morris
*Assistant Examiner*—Marlon Arce-Diaz
(74) *Attorney, Agent, or Firm*—Barnes & Thornburg LLP; Alice O. Martin

(57) ABSTRACT

The invention relates to improvements in or relating to wheelchair wheels. More particularly, the invention relates to a more ergonomically designed wheelchair wheel, and also relates to a method of manufacturing such a wheelchair wheel.

22 Claims, 4 Drawing Sheets

WHEELCHAIR WHEEL

This application claims priority to Australian applications PR6682 filed Jul. 27, 2001 and 42359/02 filed Apr. 24, 2002 and PCT/AU02/01012 filed Jul. 29, 2002.

BACKGROUND OF THE INVENTION

In this specification, where a document, act or item of knowledge is referred to or discussed, this reference or discussion is not an admission that the document, act or item of knowledge or any combination thereof was at the priority date:

part of common general knowledge; or known to be relevant to an attempt to solve any problem with which this specification is concerned.

Based upon figures from both the Australian Bureau of Statistics and the US Census Bureau, an estimated 3% of the total population are wheelchair users. Of that number, approximately half are people who use, or have the capacity to use, manual wheelchairs. That percentage is a good indication of the percentage of manual wheelchair users in developed countries of the world.

It is evident that, with the increasing average age of the population and the general advances in medical science that have prolonged the average lifespan, the general population is rapidly growing older. This is likely to lead to an increase in the demand for wheelchairs and mobility aid products. Also, those members of the population who are confined to wheelchairs will demand more user-friendly or comfortable wheelchairs.

Typically, standard wheelchair wheels have a construction based on a wheel rim, hand rim spaced apart from the wheel rim and a plurality of joining pieces attaching the hand rim to the wheel rim. In order to propel the wheelchair, the wheelchair user grips the hand rim and applies sufficient force to propel the wheelchair in the desired direction.

Although effective, the bio-mechanical forces required to propel a wheelchair can lead to secondary injuries, such as carpal tunnel syndrome (CTS), which are commonly diagnosed in wheelchair users.

The incidence of secondary injuries is often attributed to overuse of the arms, wrist and/or fingers during wheelchair activities. In some instances, researchers believe that these secondary injuries are due to the inefficient transmission of power from the hand to the hand rim. Unfortunately, the configuration of a standard wheelchair wheel includes a hand rim having insufficient area to allow for a complete grip between the wheelchair user's palm and fingers. This creates a number of problems. Firstly, there is a reduced contact area between the palm of the hand and the hand rim. The palm, being the strongest and most resilient part of the hand is unable to transfer its full force on the hand rail. The reduced contact area also increases the pressure on localised contact points on the palm of the hand, and results in relatively large forces being transmitted to various delicate nerve points of the hand. Secondly, the inability to grip the hand rim with a larger area of the palm and fingers reduces the body's mechanical efficiency by recruiting muscles for stabilisation on the hand instead of delivering power to the wheelchair.

It is also known that, with conventional wheelchair wheel configurations, there is a risk that fingers of the wheelchair user's hands may be caught or jammed in the area between the wheel and the push rim. That in turn can cause trauma to the hand and fingers—especially when the wheelchair is in motion. Furthermore, the wheelchair user may need to stop the wheelchair quickly, in which instance the force of curtailing the forward momentum of the wheelchair is likely to fall onto the fingers or small areas of the palms of the hands. This in turn may result in trauma to the hands and fingers, including dislocation of the fingers, and abrasion or "friction burns" of the skin.

These problems are even more prevalent in the rehabilitation sector which often needs to introduce people to wheelchairs for the first time. These inexperienced wheelchair users have a higher tendency to damage their hands and fingers when trying to master the use of a wheelchair.

Furthermore, it is not uncommon for an object, such as a stick or part of an item of clothing, to become caught in the space between the hand rim and the wheel. That object can and often does lead to damage to a hand when the user attempts to grip the hand rim and instead catches the moving object. Items of clothing caught in this matter can also be damaged.

One alternative is to use self-propelled or motorised wheelchairs. However, these are significantly more costly to purchase and to maintain. In any event, the users often prefer to be as self sufficient as possible and, in many instances, prefer the physical aspect of the manual wheelchair rather than relying on an electric battery and machine.

The abovementioned problems of trauma to the fingers and hands can be partially alleviated by the wearing of gloves. However, many wheelchair users find gloves uncomfortable (especially in hot weather), not aesthetically pleasing and prone to wearing out quickly.

Furthermore, standard wheelchair wheels are somewhat difficult and expensive to manufacture as a number of parts need to be joined together (eg by welding, screwing or bolting). It is also quite common for the hand rim to become partially detached from the wheel through a breakage along one or more of the joining pieces. It is also common for standard wheelchair wheels to buckle or flex due to structural weaknesses.

SUMMARY OF THE INVENTION

According to one aspect of the invention, there is provided a wheelchair wheel comprising a tyre rim, a hand rim and an intermediate cylindrical band portion extending between said rims, wherein the rims and the band portion are integrally formed.

The cylindrical band portion is dimensioned so as to provide a large contact area for contact with a portion of the palm of the wheelchair user's hands (eg the base of the hand at or about the thenar emanence muscle). The tyre rim section, as shown in the figures, includes a wheel strengthening means in the form of a tubular body that is located radially inward of the channel of the rim. The tubular body substantially underlies and is substantially coextensive with the channel of the tyre rim.

The invention therefore provides a wheelchair wheel with an improved contact area which allows the user to increase the bio-mechanical efficiency required to propel the chair while decreasing the chances of injury to the wheelchair user's hands. The cylindrical band also reduces the incidents of jammed thumbs, fingers and external objects between the tyre rim and the hand rim.

The integral nature of the wheel provides greater mechanical strength. Since the wheel according to the invention does not require any components (such as screws, bolts or welds) to join the respective rims, the wheel is cheaper to manufacture, stronger and more resilient as there are less parts and less likelihood that these parts may breakdown.

The integral nature of the wheel also provides the hand rim with an additional degree of stability which renders both the hand rim and the tyre rim less likely to buckle and flex. The wheel according to the invention is hence more resilient and longer lasting.

The cylindrical band portion may take any suitable shape. The cylindrical band portion may be substantially flat or it may have a curved cross-section.

In a further preferred form of the invention, the cylindrical band portion has a trough extending about the entire band. Preferably, the contour (or shape) of the trough substantially corresponds with the contour (or shape) of the base of a human hand. In this preferred embodiment, the contour of the trough provides a large contact surface for the palm of the hand while the fingers are also able to flex and grip the hand rim. This contour of the trough makes it far more convenient and comfortable for a user to propel the wheelchair.

In another preferred form of the invention, the cylindrical band portion has a convex ridge extending about the entire band. In this preferred embodiment, the contour of the convex ridge provides a large contact surface for the palm while the fingers are also able to flex and grip the hand rim. The contour of this convex ridge makes it convenient and comfortable for a user to propel the wheelchair.

The cylindrical band portion may include perforations. According to this preferred form of the invention, the perforations result in a wheel which is overall more lightweight.

The hand rim may take any suitable form. Typically, it is shaped so that the fingers of a user's hand may comfortably bend about the contour of the hand rim. Accordingly, the cross-sectional shape (or profile) of the hand rim may be circular, substantially circular, oval, elliptical or it may simply be a convex curved section. The dimensions of the hand rim are generally determined so as to facilitate the gripping of the hand rim with the user's fingers.

The diameter of the hand rim itself may be substantially equal to the diameter of the tyre rim (or the wheel). The diameter of the hand rim is preferably less than that of the tyre rim.

The hand rim may also include perforations. According to this preferred form of the invention, the perforations result in a wheel which is overall more lightweight.

The tyre rim may take any suitable form. The tyre rim includes an outwardly facing channel defining a recess in which a tyre is locatable. The dimensions of the recess correspond to the dimensions of a standard tyre size to enable a standard sized tyre to be selectively fitted on to the tyre rim. In a particularly preferred embodiment, the tyre rim further includes a wheel strengthening means to provide the wheel with a greater degree of rigidity and strength. The wheel strengthening means may take any suitable form. In a preferred embodiment, the wheel strengthening means is a substantially tubular body underlying the tyre rim. The substantially tubular body may have any suitable cross-sectional profile, such as, triangular, square, circular, part-circular, elliptical, and any other suitable cross-sectional profile.

The wheelchair wheel may be made of any suitable material. Preferably, the wheel is made from a resilient material, such as aluminium, metal alloy, carbon-fibre or fibreglass. The wheelchair wheel may be suitably coated or otherwise treated to render the wheel substantially rust proof and/or water proof.

The wheelchair wheel may take any suitable form and dimension. Preferably the wheel has a dimension comparable to that of standard wheelchairs. The wheel can therefore be fitted to an existing wheelchair.

According to another aspect of the invention, there is provided a method for manufacturing a wheelchair wheel as described herein. The wheelchair wheel may be manufactured by any suitable manufacturing method. When the wheelchair wheel is formed of a metal or metal alloy, it is preferably manufactured by extruding the wheelchair wheel from a suitably shaped mould, bending it into the required circular shape and then joining the ends in any suitable manner (such as welding)

In a further aspect of the invention, there is provided a wheelchair comprising at least one wheelchair wheel as described herein.

DESCRIPTION OF THE DRAWINGS

The invention will now be further explained and illustrated by reference to the accompanying drawings in which.

Turning to the drawings, a wheelchair wheel 1 is provided, having a tyre rim 2; a hand rim 3 and an intermediate cylindrical band portion 4 extending between the rims. The tyre rim 2, the hand rim 3 and the band portion 4 are all integrally formed to provide a single unitary element.

The cylindrical band portion 4 is dimensioned so as to provide a contact area for the hands of a wheelchair user (not shown).

Figure 4:
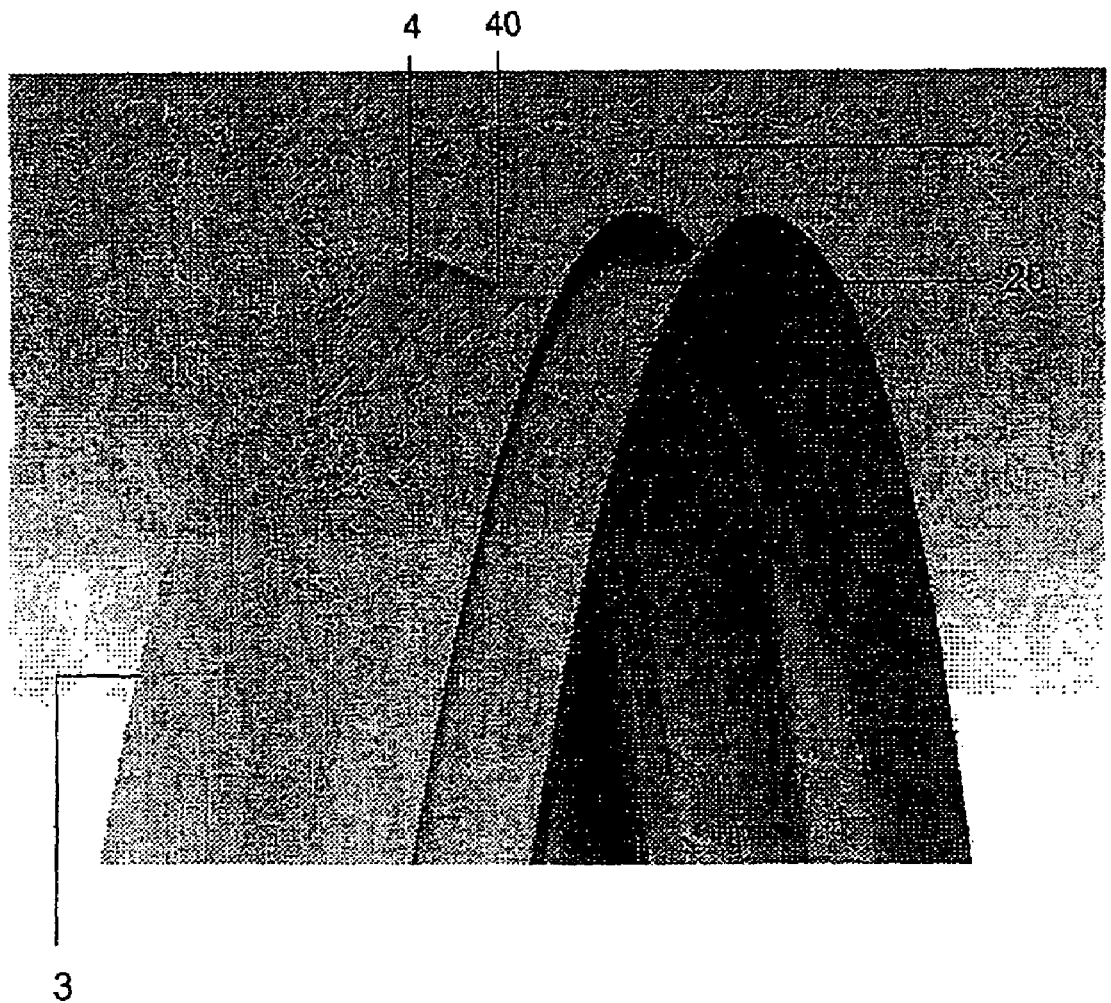
FIG. 4 is a perspective view of the wheelchair wheel of FIG. 1.

As can be seen, particularly from FIG. 4, the wheelchair wheel 1 provides an improved contact area which allows wheel chair users to increase the mechanical efficiency required to propel the chair while decreasing the chances of injury to their hands.

The wheelchair wheel 1 being integrally formed as a unitary component negates the incidents of jammed thumbs and fingers between the tyre rim 2 and the hand rim 3 as there is no space between the respective rims.

The integral nature of the wheelchair wheel 1 also provides the hand rim 3 with an additional degree of stability which renders both the hand rim 3 and the tyre rim 2 less likely to buckle and flex. The wheelchair wheel may therefore be more resilient and durable.

The wheel 1 has a dimension comparable to that of standard wheelchair wheels which allows the wheel 1 to be fitted to an existing wheelchair.

Figure 1:
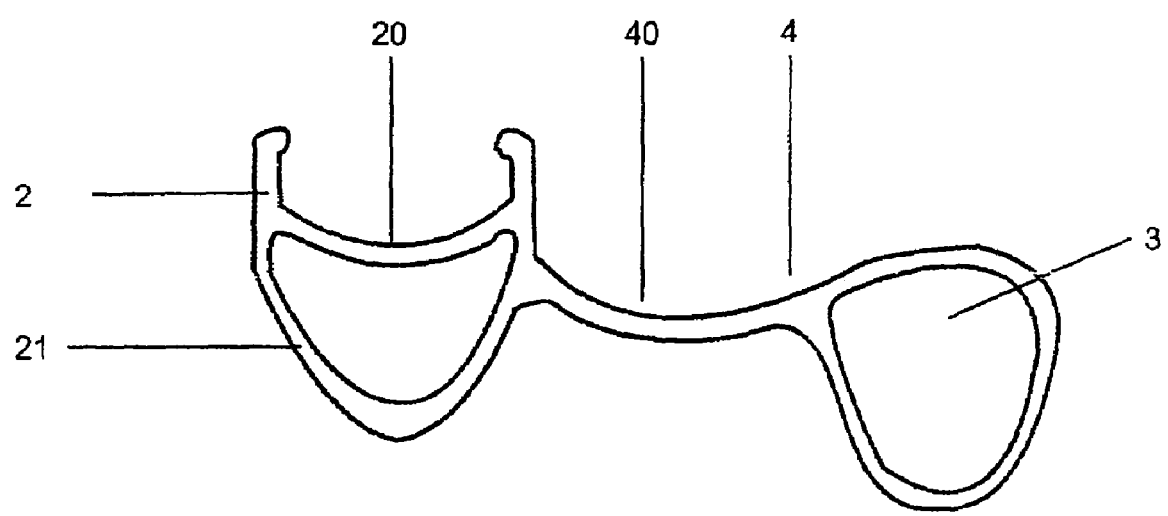
FIG. 1 is a cross-sectional view of a wheelchair wheel according to one form of the invention.
Figure 2:
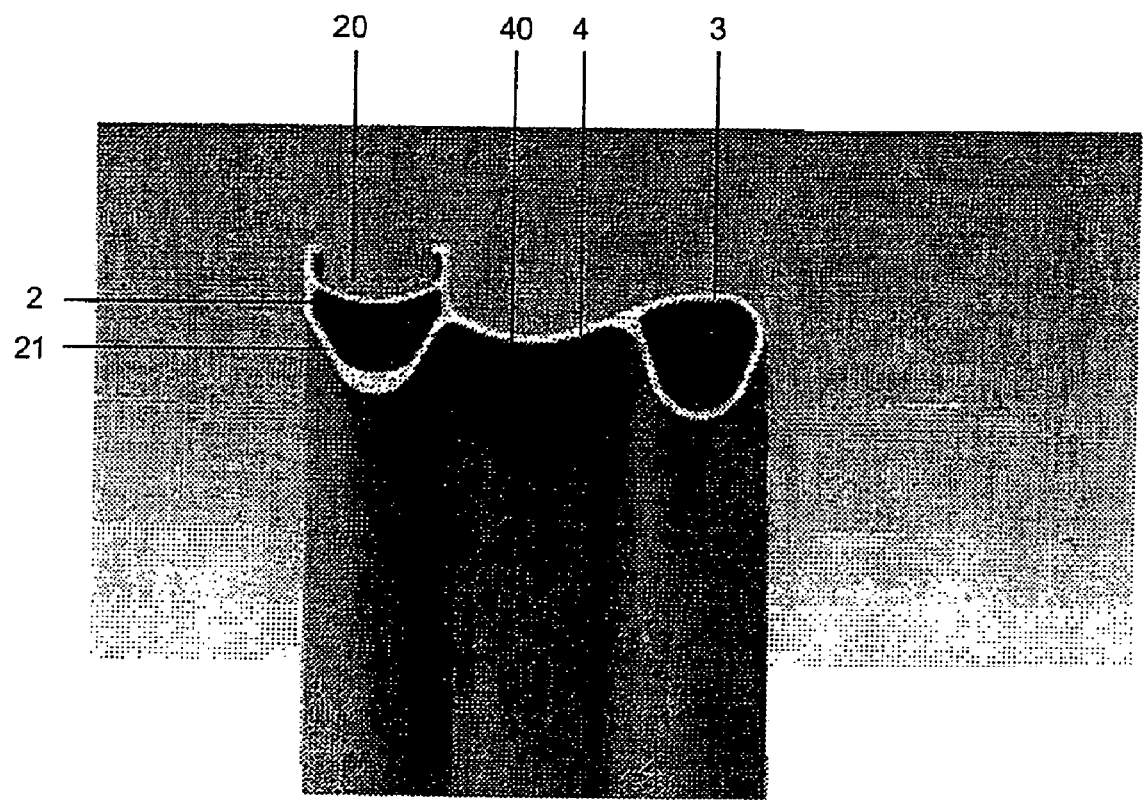
FIG. 2 is a cross-sectional perspective view of the wheelchair wheel of FIG. 1.
Figure 3:
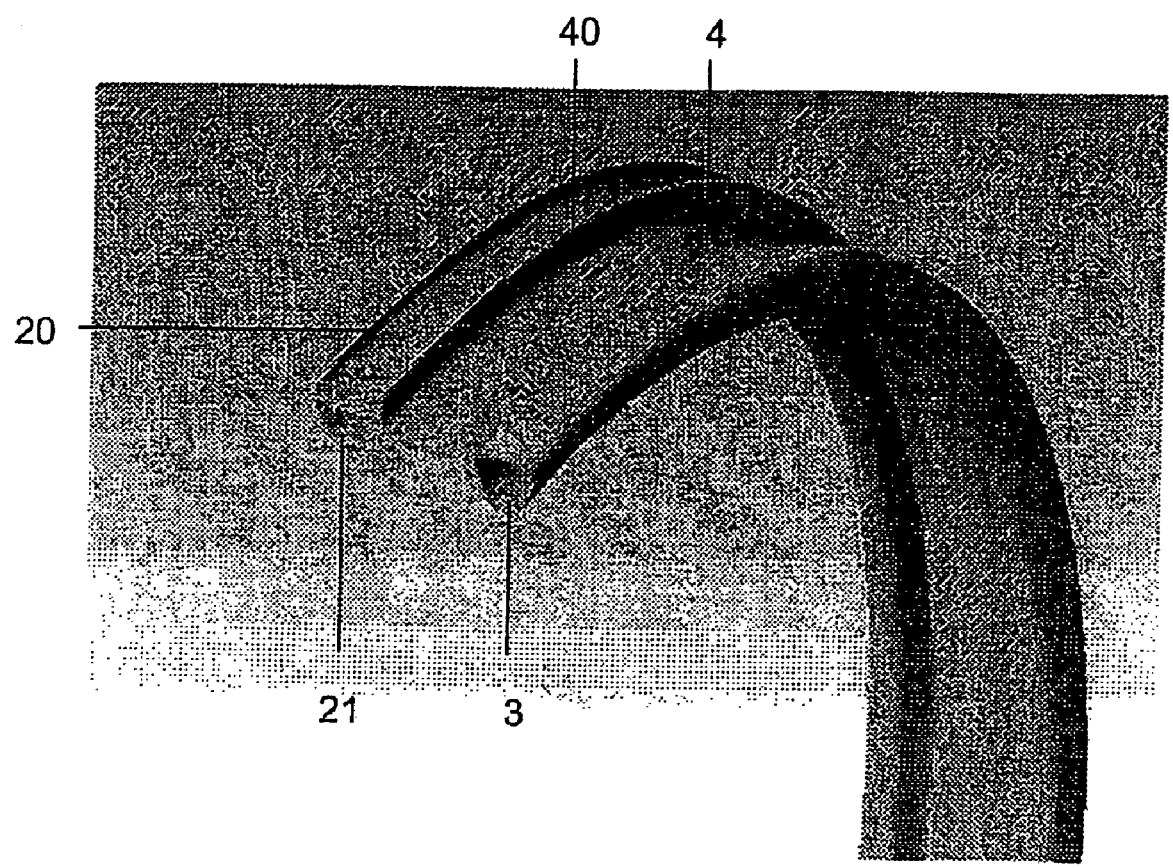
FIG. 3 is a further cross-sectional perspective view of the wheelchair wheel of FIG. 1.

As can be seen from FIG. 1, the diameter of the hand rim 3 is approximately equal to the diameter of the tyre rim 2. The diameter of the hand rim 3 should be less than the diameter of the tyre (when measured from the outer circumference of the tyre) which is attached to the rim. Clearly, this is so that the hand rim does not generally contact the ground when the tyre is attached.

The hand rim 3 is shaped to have a curved cross-section as to facilitate the easy gripping of the hand rim 3 by a wheelchair user.

In the wheel shown in the accompanying figures, the band portion 4 has a contoured trough 40 extending circumferentially about the entire band portion 4. The contour (or shape) of the trough 40 substantially corresponds with the shape of the base of a human hand. The contour of the trough 40 provides a greater contact surface for the palm while the fingers are also able to flex and grip the hand rim 3. The contour of the trough 40 makes it far more convenient and comfortable for a user to propel the wheelchair.

The tyre rim 2 includes an outwardly facing channel 20 defining a recess in which a tyre is locatable. The dimensions of the recess correspond to the dimensions of a standard tyre size to enable a standard sized tyre to be selectively fitted to the tyre rim 2. The tyre rim 2 further includes a wheel strengthening means 21. As is shown in the accompanying figures, the wheel strengthening means is in the form of a substantially tubular section 25 underlying the tyre rim to provide the wheelchair wheel 1 with a greater degree of rigidity and strength.

The wheelchair wheel 1 is made of from a resilient material such as aluminium, a metal alloy, carbon-fibre or fibreglass and is treated as necessary to render the wheelchair wheel 1 both water and rust proof.

Throughout this specification, unless the context requires otherwise, the word "comprise" or variations such as "comprises" or "comprising", will be understood to imply the inclusion of a stated element, integer or step, or group of elements, integers or steps, but not the exclusion of any other element, integer or step, or group of elements, integers or steps.

Modifications and improvements to the invention will be readily apparent to those skilled in the art. Such modifications and improvements are intended to be within the scope of this invention.

The invention claimed is:

1. A wheelchair wheel comprising:
   a tyre rim section having a tyre rim channel and wheel strengthening means, said wheel strengthening means comprising a tubular body located radially inwards of said channel;
   a hand rim; and
   an intermediate band portion extending between said wheel strengthening means and said hand rim.

2. The wheelchair wheel according to claim 1, wherein the tubular body substantially underlies, and is substantially coextensive with, the tyre rim channel.

3. The wheelchair wheel according to claim 2, wherein the tubular body comprises a first wall which separates the tyre rim channel from the hollow defined by the tubular body.

4. The wheel chair wheel according to claim 3, wherein the first wall of the tubular body comprises a base of said channel.

5. The wheelchair wheel according to claim 4, wherein the tubular body further comprises a second wall which in combination with said first wall, defines said hollow.

6. The wheelchair wheel according to claim 5, wherein the second wall of the tubular body has a cross-sectional shape selected from U-shaped and V-shaped.

7. The wheelchair wheel according to claim 6, wherein end portions of the second wall are in substantial alignment with sidewalls of the channel.

8. The wheelchair wheel according to claim 1, wherein the base of the channel has a concave bend so as to conform substantially with the profile of a tyre adapted to be seated thereon.

9. The wheelchair wheel according to claim 1, wherein the intermediate band portion has a substantially flat cross-section.

10. The wheelchair wheel according to claim 1, wherein the intermediate band portion has a curved cross-section.

11. The wheelchair wheel according to claim 10, wherein the curved cross-section is a trough extending about the entire band.

12. The wheelchair wheel according to claim 11, wherein the trough has a contour which substantially corresponds with the contour of the base of a palm of a human hand.

13. The wheelchair wheel according to claim 10, wherein the curved cross-section is a convex ridge extending about the entire band.

14. The wheelchair wheel according to claim 9, wherein the intermediate band portion contains perforations.

15. The wheelchair wheel according to claim 1, wherein the hand rim has a cross-sectional shape selected from straight, curved, substantially circular, substantially oval and substantially elliptical.

16. The wheelchair wheel according to claim 15, wherein the radius of the hand rim, measured from the axis of the wheel, is less then the radius of the tyre rim.

17. The wheelchair wheel according to claim 15, wherein the hand rim contains perforations.

18. The wheelchair wheel according to claim 1, wherein the wheelchair wheel is made from a resilient material.

19. The wheelchair wheel according to claim 18 wherein the resilient material is selected from the group consisting of aluminum, a metal alloy, carbon-fibre and fibreglass.

20. The wheelchair wheel according to claim 1, wherein the wheelchair wheel is coated with rust-proofing material to render the wheelchair wheel substantially rust proof.

21. A method of manufacturing the wheelchair wheel according to claim 1 comprising the steps of extruding resilient material from a mould to form an extruded section having a defined length and two ends, bending the section into a required circular shape, and joining the ends of the extrusion to form the wheelchair wheel.

22. A wheelchair comprising at least one wheelchair wheel according to claim 1.

* * * * *